No. 776,358. PATENTED NOV. 29, 1904.
E. T. SHORTT.
COFFEE ROASTER.
APPLICATION FILED APR. 2, 1904.
NO MODEL. 2 SHEETS—SHEET 1.

Witnesses
Inventor
Everett T. Shortt.
By Victor J. Evans
Attorney

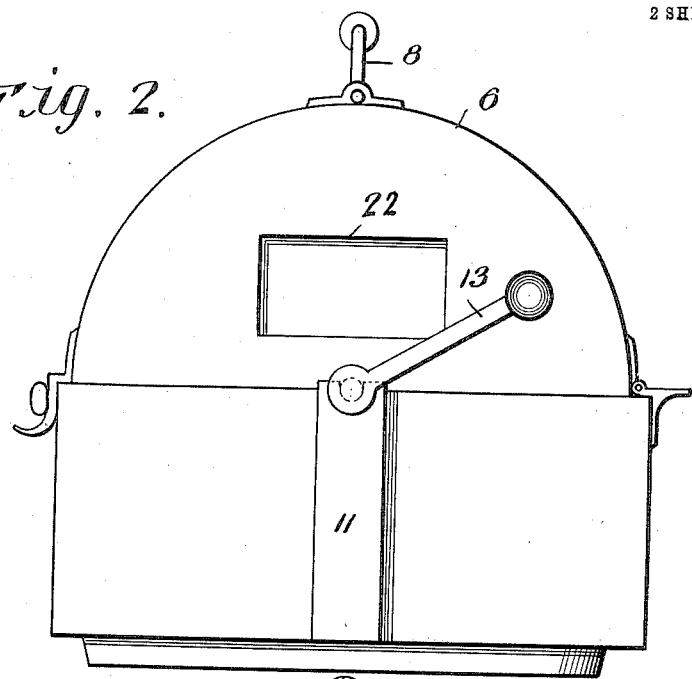
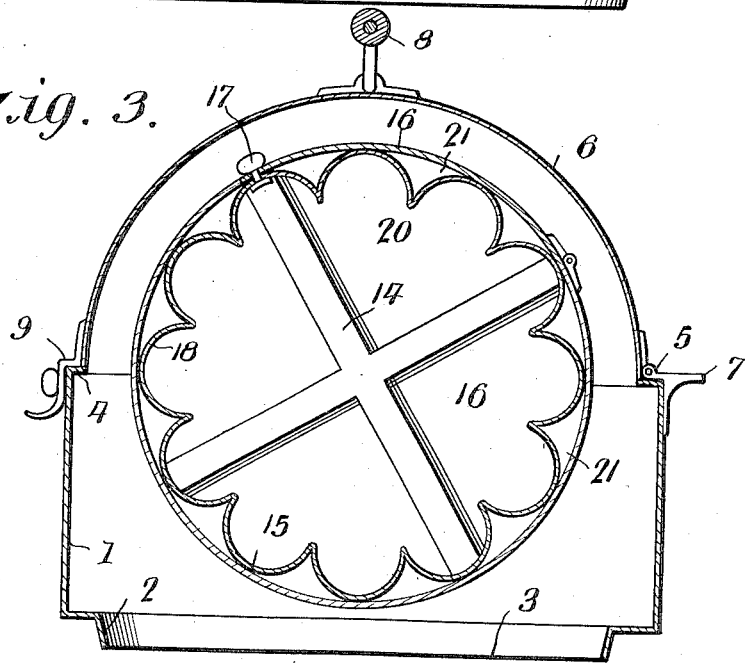

No. 776,358.

Patented November 29, 1904.

UNITED STATES PATENT OFFICE.

EVERETT T. SHORTT, OF NORFOLK, VIRGINIA.

COFFEE-ROASTER.

SPECIFICATION forming part of Letters Patent No. 776,358, dated November 29, 1904.

Application filed April 2, 1904. Serial No. 201,316. (No model.)

*To all whom it may concern:*

Be it known that I, EVERETT T. SHORTT, a citizen of the United States, residing at Norfolk, in the county of Norfolk and State of Virginia, have invented new and useful Improvements in Coffee-Roasters, of which the following is a specification.

My invention relates to new and useful improvements in roasters for coffee, peanuts, and other like articles; and its object is to provide a simple, durable, and compact device of this character which will uniformly roast the contents thereof and preserve their strength and aroma.

The invention consists of a casing having a closure thereon, and within this casing is revolubly mounted a drum upon the inner face of which is arranged a series of air-cells which are adapted to moderate the heat applied to the contents of the drum.

The invention also consists of means whereby said contents are thoroughly agitated and mixed during the roasting operation, whereby all particles thereof are thoroughly acted upon by the hot air.

The invention also consists in the further novel construction and combination of parts hereinafter more fully described and claimed, and illustrated in the accompanying drawings, showing the preferred form of my invention, and in which—

Figure 1:
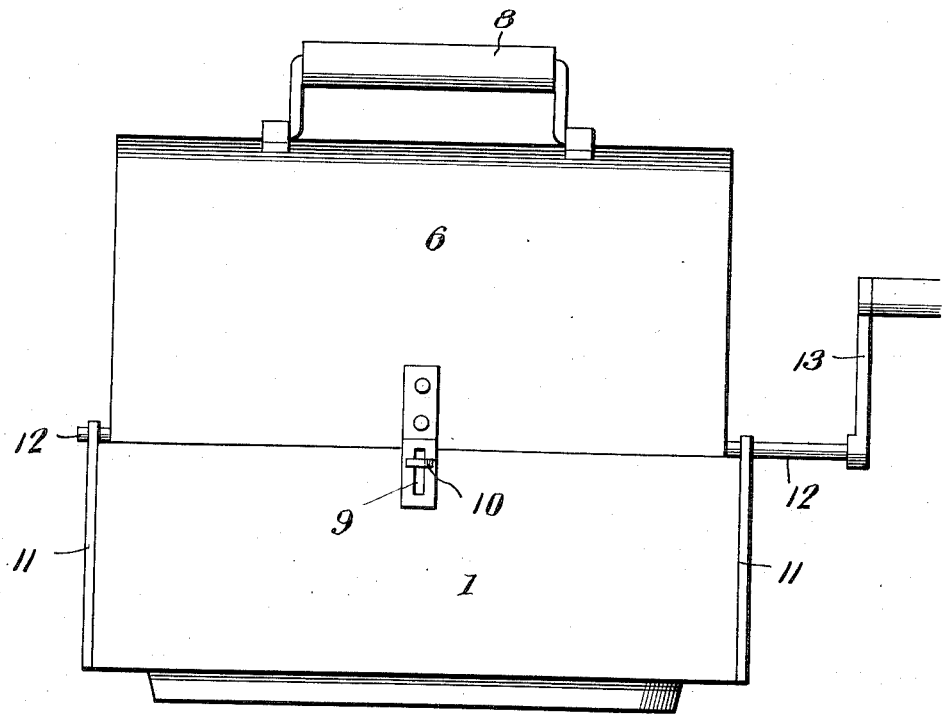
Figure 4:
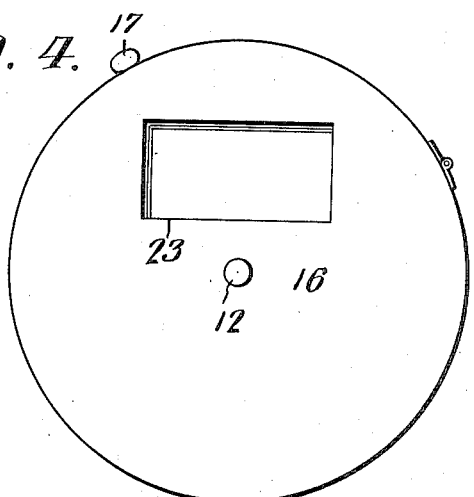

Figure 1 is a side elevation of the roaster. Fig. 2 is an end elevation thereof. Fig. 3 is a central vertical transverse section, and Fig. 4 is an end elevation of the drum detached.

Referring to the figures by numerals of reference, 1 is a preferably rectangular casing having a circular flange 2 at the bottom thereof, which incloses an inlet-opening 3, the upper edge of the casing being provided with an inwardly-extending flange 4. Hinges are secured to one side of the casing 1 and overlap the adjoining portion of flange 4, and these hinges are connected to a semicylindrical cover 6, which is adapted when closed to rest on the flange 4. The hinges 5 have ledges 7 integral therewith, which serve to support the cover when the same is opened. A handle 8 is secured to the top of the cover, and a hooked plate 9 is secured to one edge of said cover at a point opposite the hinges 5 and has a longitudinally-extending slot 9 therein. This slot is adapted to receive a button 10, which is pivoted to the casing 1 and serves to lock the cover in closed position. Reinforcing-strips 11 are secured to the ends of casing 1 and extend slightly above the upper edges thereof, and journaled within these reinforcing-strips are trunnions 12, one of which is provided at its end with a crank 13, whereby the same can be readily rotated. These trunnions extend from cross-strips 14, which are secured to the ends of a cylindrical drum 15, which is supported within the casing 1 and extends upward into the cover 6. This drum has a hinged closure 16, which is adapted to be held in closed position by a button 17. A lining 18 is arranged within the drum and is provided with a series of parallel semicylindrical grooves 19, forming tapered ribs 20, and in rear of these ribs and between the lining 18 and the drum 15 are formed air-cells 21. An opening 22 is formed in one end of the cover 6 and preferably closed by mica or other transparent non-fusible material, and a similar opening 23 is formed in one end of the drum 15 and is also covered with mica or like material.

The article to be roasted is placed within the drum 15 by first opening the covers 6 and 16 and then closing the same. Drum 15 is rotated by means of crank 13, and the contents thereof are acted upon successively by ribs 20 and are carried upward and then dropped. They will thus be thoroughly mixed and all portions thereof will be acted upon by the hot gases. The air-cells 21 prevent overheating or burning of the contents of the drum. It will be seen that by providing a device such as herein described the articles placed therein will be thoroughly roasted within a short period. The condition of the contents can be readily determined by gazing through the apertures 22 and 23.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

In a device of the character described, the combination with a casing having an opening in its bottom, a depending flange encircling the opening, a cover upon the top of the casing, and brackets for supporting the cover in opened position; of a drum revolubly mounted within the casing, means for rotating the drum, a closure upon the drum, a corrugated lining within the drum consisting of a continuous strip of material forming parallel ribs and air-cells between the ribs and drum, and transparent portions in the drum and cover of the casing and adapted to register.

In testimony whereof I affix my signature in presence of two witnesses.

EVERETT T. SHORTT.

Witnesses:
GLUM FOSTER,
CHAS. F. FLINN.